(12) United States Patent
Deng et al.

(10) Patent No.: US 8,880,558 B2
(45) Date of Patent: Nov. 4, 2014

(54) CLOUD SERVICES CREATION BASED ON GRAPH MAPPING

(75) Inventors: Yu Deng, Hawthorne, NY (US);
Michael R. Head, Hawthorne, NY (US);
Andrzej Kochut, Hawthorne, NY (US);
Jonathan P. Munson, Hawthorne, NY (US); Anca Sailer, Hawthorne, NY (US); Hidayatullah Shaikh, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 444 days.

(21) Appl. No.: 12/829,177

(22) Filed: Jul. 1, 2010

(65) Prior Publication Data

US 2012/0005236 A1    Jan. 5, 2012

(51) Int. Cl.
*G06F 17/00* (2006.01)
*G06F 9/44* (2006.01)

(52) U.S. Cl.
USPC ........................... 707/798; 717/104; 717/174

(58) Field of Classification Search
CPC ......... G06F 17/3089; G06F 8/34; G06F 8/35; G06F 9/5027; G06F 9/44; G06F 8/70; G06F 9/445; G06F 15/177; G06F 3/122; G06F 8/10; G06F 8/20; G06F 8/36; G06F 9/44505
USPC .......................................... 707/798; 717/105
See application file for complete search history.

(56) References Cited

U.S. PATENT DOCUMENTS

| | | | |
|---|---|---|---|
| 5,991,803 A | 11/1999 | Glitho et al. | |
| 6,694,002 B2 | 2/2004 | Creamer et al. | |
| 6,847,970 B2 * | 1/2005 | Kar et al. | 1/1 |
| 6,892,228 B1 | 5/2005 | Penders | |
| 7,266,582 B2 * | 9/2007 | Stelting | 709/201 |
| 7,334,216 B2 * | 2/2008 | Molina-Moreno et al. | 717/109 |
| 7,389,342 B2 | 6/2008 | Sundar et al. | |
| 7,509,648 B1 | 3/2009 | Afshar et al. | |
| 7,672,957 B2 * | 3/2010 | Cotichini et al. | 707/794 |
| 8,019,860 B2 * | 9/2011 | Ivanov et al. | 709/224 |
| 8,037,471 B2 * | 10/2011 | Keller et al. | 717/174 |
| 2005/0234964 A1 * | 10/2005 | Batra et al. | 707/102 |
| 2008/0271008 A1 * | 10/2008 | Dettori et al. | 717/168 |
| 2010/0138674 A1 * | 6/2010 | Dimitrakos et al. | 713/194 |
| 2011/0126168 A1 * | 5/2011 | Ilyayev | 717/103 |

* cited by examiner

*Primary Examiner* — Michelle Owyang
(74) *Attorney, Agent, or Firm* — F. Chau & Associates, LLC; Louis J. Percello

(57) ABSTRACT

A method for service creation based on graph mapping including constructing a graph having leaf nodes in an environment including business support nodes associated with respective services and operations support nodes including attribute models, identifying a plurality of services at a level of the leafs in the graph, extending the graph by representing existing services offerings in terms of operation level service definitions and new services at the level of the leafs, and re-combining leaf nodes to define new services at service creation time.

17 Claims, 5 Drawing Sheets

CLOUD SERVICES CREATION BASED ON GRAPH MAPPING

BACKGROUND

1. Technical Field

The present disclosure generally relates to service creation, and more particularly to service creation based on hierarchical relationships between/among components on an environment.

2. Discussion of Related Art

Information technology (IT) clouds, implemented as virtualized data centers, have enabled new opportunities for the creation, deployment, management and usability of new services. Distributed users, from individuals to businesses, have been taking advantage of the cloud services automation and scalability benefits. However, the work of creating services is dominated by intensive manual labor. Even in cases where offerings have similar infrastructure requirements and dependencies, the solutions are typically built from scratch as separated entities, making the service development ineffective and error prone.

Therefore a need exists for means for enabling a semi-automated service creation by leveraging a graph knowledge representation of existing services, processes and their constraints.

BRIEF SUMMARY

According to an embodiment of the present disclosure, a method for service creation based on graph mapping including constructing a graph having leaf nodes in an environment including business support nodes associated with respective services and operations support nodes including attribute models, identifying a plurality of services at a level of the leafs in the graph, extending the graph by representing existing services offerings in terms of operation level service definitions and new services at the level of the leafs, and re-combining leaf nodes to define new services at service creation time.

BRIEF DESCRIPTION OF THE SEVERAL VIEWS OF THE DRAWINGS

Preferred embodiments of the present disclosure will be described below in more detail, with reference to the accompanying drawings.

DETAILED DESCRIPTION

Figure 1:
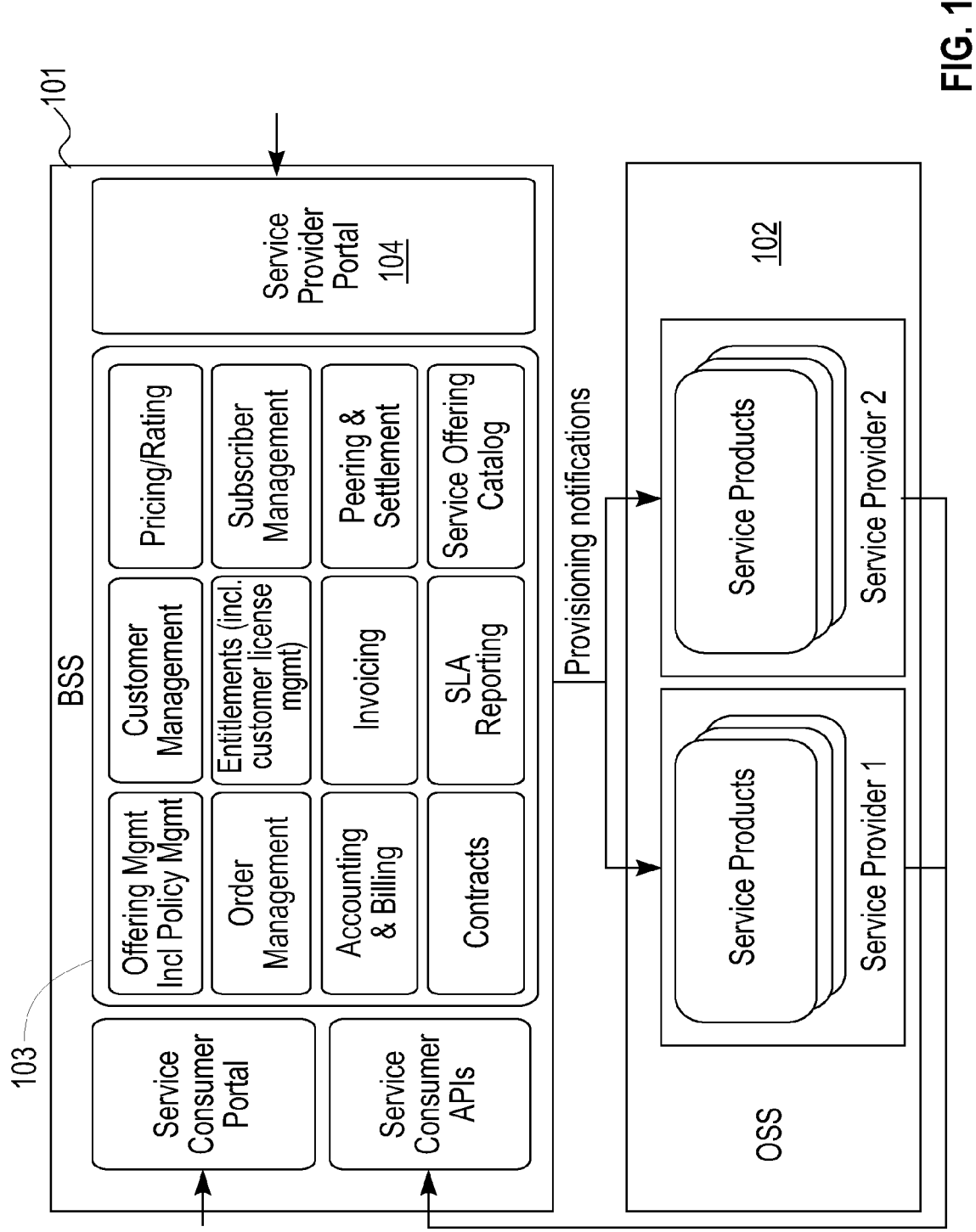
FIG. 1 shows a services framework composed of business support services (BSS) platform and operation support services platform (OSS)

According to exemplary embodiments of the present disclosure, a graph based method is used for semi-automated services creation and optimized services mapping between a business support system and an operations support system. Here, hierarchical relationships between/among components of a business support system and an operations support system are used to define new services.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Exemplary embodiments of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

According to exemplary embodiments of the present disclosure, information technology (IT) operations knowledge is identified and exposed at a leaf level of a graph in the form of services. The graph is extended by representing existing services offerings in terms of these operation level service definitions as well as services offerings.

At service creation time, an offering manager can re-combine building blocks to define new services. It should be noted that new services may be created and added from scratch and implemented down to the operations support system. Parameters, constraints, dependencies, cost of service offering sub-components and definitions mapped down to the data center hardware are also taken into consideration.

Through the graph based approach, the service creation is performed through modular re-composition and dynamic access to services' sub-components with flexible sourcing and service operation placement optimization.

Figure 2:
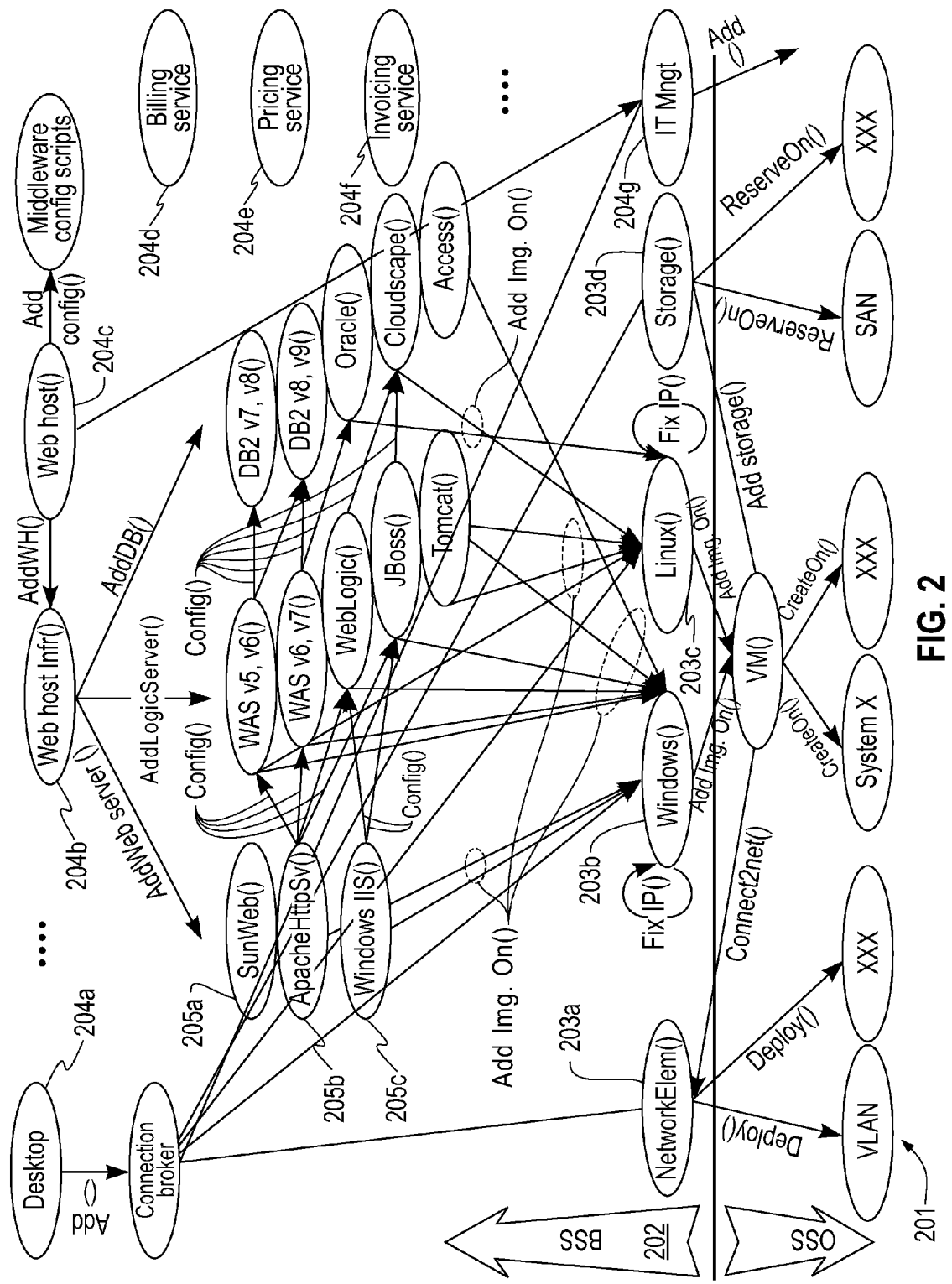
FIG. 2 is a cloud services graph as a support for service creation according to an embodiment of the present disclosure.
Figure 3:
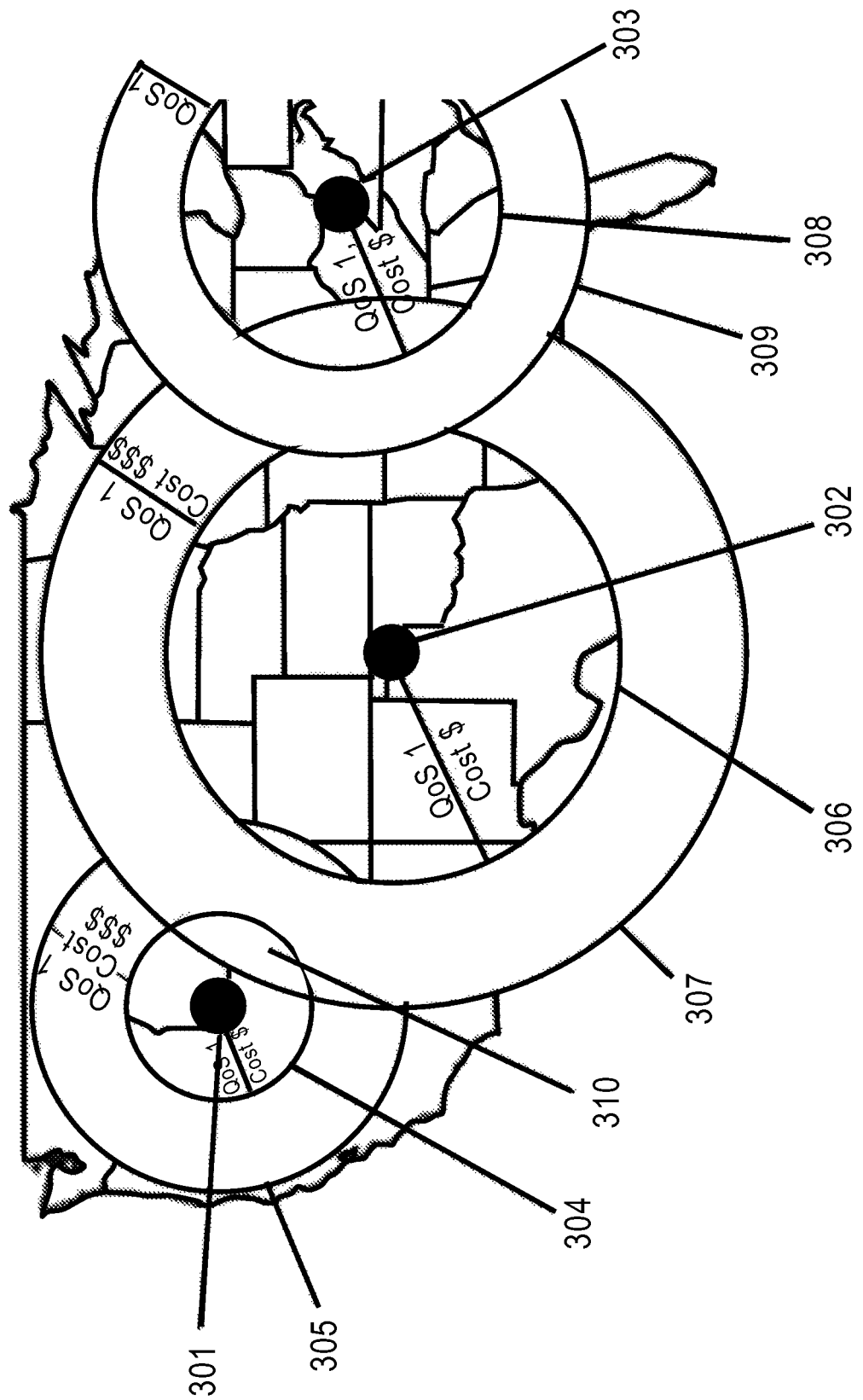
FIG. 3 is a diagram illustrating the deployment of services based on customer location information, service cost information and QOS requirement information, according to an exemplary embodiment of the present disclosure.

An exemplary embodiment of a cloud services creation and deployment system based on graph mapping leveraging is described herein and illustrated in the FIGS. 1-3. Each item and the information processing involved during the operational phase of the system are described below.

An exemplary IT services framework is illustrated in FIG. 1 including a business support platform 101, namely Business Support Services (BSS), and an IT operation services platform 102, namely Operation Support Services (OSS).

The BSS 101 aid in operations involved in running a business, including customer management, order management, revenue management and product management.

The OSS 102 process requests from a BSS 101 for a data center. Such requests may include virtual machine creation and deletion, network and storage reservation and image management. In order to provide this service, the OSS knows about the configuration and current state of the data center.

BSS and OSS platforms 101-102 are linked in the need to support various end to end services that are listed and described in the Services Catalog 103 in the BSS. The creation of these services is described in detail herein.

The service developer can explore existing services offered by a BSS provider in their Services Catalog 103, for example on line though the Services Provider Portal 104. The portal 104 allows a hierarchical visualization of services' features, e.g., sub-components, requirements, constraints, operation rules, etc., at different levels of detail. An example of knowledge representation of the services and their features that could enable a hierarchical visualization is illustrated by the graph in FIG. 2.

Figure 4:
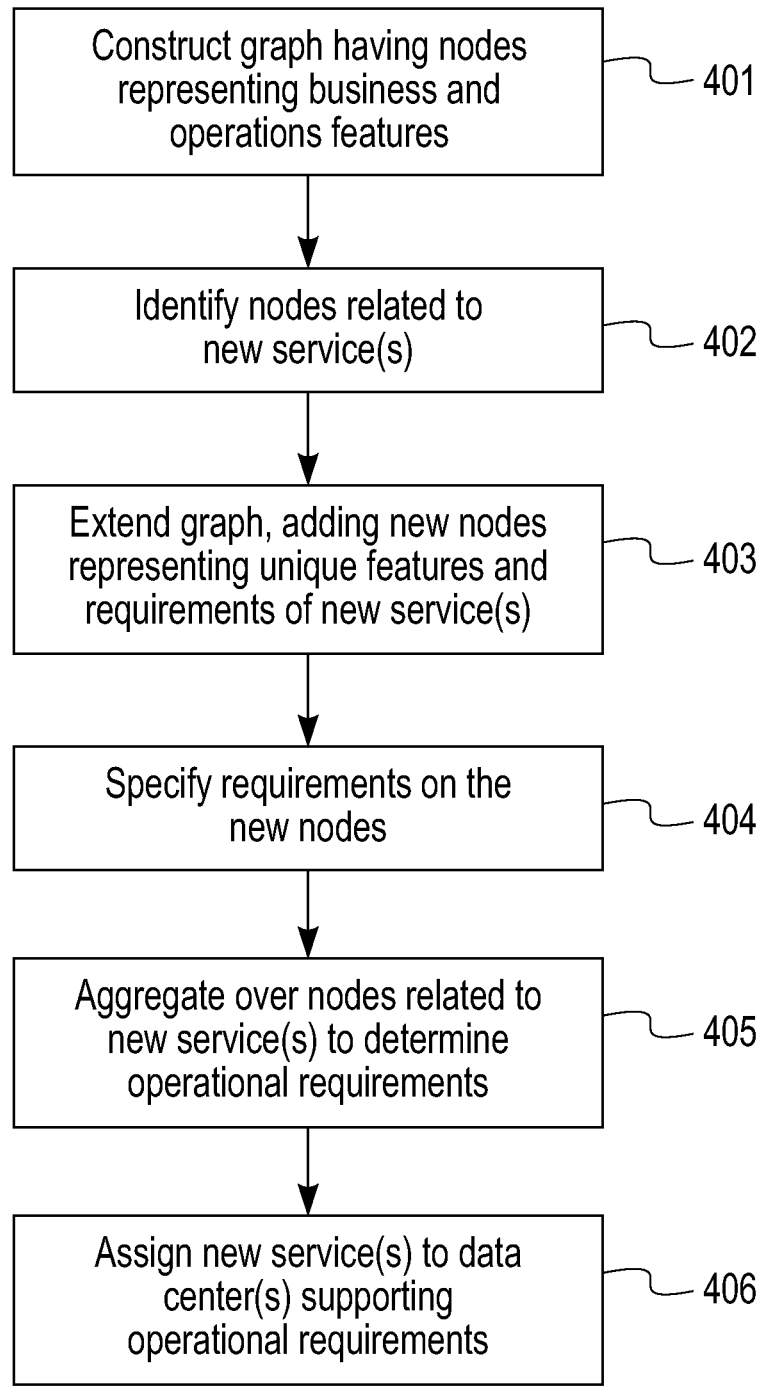
FIG. 4 is a flow chart of a method according to an embodiment of the present disclosure.

Referring to FIGS. 2 and 4, the IT configuration items characteristic of OSS are represented as nodes 201 of graphs at the OSS level and are exposed to the BSS in the form of basic services (e.g., nodes 203*a-d*) as leaves of the BSS services graph 202 (see blocks 401 and 402, FIG. 4). The BSS graph 202 is extended by representing existing services offerings (e.g., nodes 204*a-g*) as composed of these operation level services as well as of the basic services offerings (see block 403, FIG. 4).

Services composition and configuration are enabled through OSS and BSS processes and scripts as illustrated in the graph in FIG. 2 by first type links (e.g., Add Img. On ( )) and second type links (i.e., Config( ) links between nodes on the BSS services graph), respectively. The composition and configuration are based on services' description and requirements defined, as applicable, at individual nodes for each BSS service and OSS configuration item (see block 404, FIG. 4). Operational requirements may be expressed as rules on attributes such as CPU, RAM, IP, storage, etc. (for hardware), version, dependencies, license, etc. (for software), response time, jitter etc. (for quality of service) (see block 405, FIG. 4). The rules are to be populated with values both at service creation time (for product requirements) and at service subscription time (for customer requirements). Examples of operational requirements available at service creation time are recommended configurations such as amount of RAM, hard drive or CPU required by particular products. The number of WAS servers or fixed IP addresses are examples of customer requirements available only at service subscription time. A function (e.g., sum, max, min) and a condition when to apply the function are associated with attributes whose values need to be aggregated (e.g., summed up, maximized, minimized). For example, the amount of RAM required by applications installed on a same machine is to be cumulated, thus making the function for the RAM attribute sum-when same VM. Similarly, network bandwidth when shared among multiple VPNs is to be cumulated, making the function for the Bandwidth attribute sum-when same VPN. The concrete value associated with a requirement may not necessarily be a unique number. Example of rules populated with concrete values are CPU within {2, 4} values, RAM within {1024, 4048} values, the IP randomly allocated within the given network sub-net 255.255.255.0, or the delay within the interval (300 ms to 800 ms).

Such a Services Catalog graph can be presented for manipulation at the front end in the same way Rational tools present the software plug-ins for composition, for example, in the same manner that UML (Unified Modeling Language) editors, such as those included in various Rational tools, represent software components visually and allow them to be connected graphically using boxes and arrows. However, in addition to what software composition tool offer, the building blocks in the current disclosure relate to an operational infrastructure in the data center, while the service deployment and provisioning into the infrastructure is done optimizing the placement as detailed in the next sections.

To illustrate the creation of a new service, consider for example, the creation of a Web Hosting service which provides a dynamically provisioned three tier web distributed infrastructure composed of HTTP Servers, Web Application Servers and Database Servers. The Web Hosting Infrastructure service, assumed present in the Services Catalog, it is a good match in providing a static three tier web distributed infrastructure. However, this is not sufficient for the Web Hosting service, since the users expect support to configure their environment as well as a dynamic infrastructure depending on the workload. Thus, the new Web Hosting service can leverage the existing Web Hosting Infrastructure as a building block and additionally needs to develop middleware configuration scripts and IT monitoring support. Optionally, the new Web Hosting service can leverage the existing BSS building block services for billing, pricing, invoicing etc., assuming they are available in the Services Catalog. The new developed sub-services may require additional OSS capabilities, in which case, at service deployment time when the requirements are matched against the service provider capabilities, a decision will be taken whether to add these new capabilities to the OSS and the new service to the BSS Services Catalog.

Similarly, the Desktop service creation can leverage exiting OSS and BSS services as building blocks for its own sub-components. Desktop Cloud is a way of delivering virtual desktops where virtual machines executing desktop OS run in remote data center operated by a service provider. Users access their desktops using stateless devices called thin-clients. A Connection Broker is a component of the Desktop Cloud service. The Connection Broker is a management component mediating user connections, establishing identity and entitlements, as well as managing back-end infrastructure in response to changes in user activity and demand for desktop services. Connection Broker may be implemented as a set of virtual machines performing key management functions including: database, web portal, back-end resource management, and security and tunneling. In order for the system to scale based on the user demand, the number of virtual machine instances implementing these functions can dynamically change. The Connection Broker requests new virtual machines from the OSS and then configures them appropriately to support required functions. It also creates virtual machines running actual desktops (and later assigned to users). The decision where to place those desktop VMs is based on multiple factors including network latency and throughput between the data center and user's location, required CPU and memory, security and governance constraints, and also the cost considerations.

Even though there is significant uniqueness to the Desktop service, it can still reuse functionality provided by BSS and OSS. For example, customer on-boarding, account activation, rating, billing, and cost accounting can be composed based on existing BSS services. Also, most of connection broker's OSS requests (such as VM provisioning, OS deployment, VLAN setup, etc.) can be fulfilled using the basic OSS services.

Thus, a new service creation implies a new service description materialized as graph links into sub-services as well as new requirements as described in the examples above. Additionally, a service developer may specify scalability rules. For example, in the Web Hosting case where the deployment requirements vary with the load increase, the scalability rules express the mapping of service load to IT resources For large catalogs with numerous services and complex dependencies, besides the bottom-up services composition approach presented above, where the service developer has the knowledge of the particular building block services they want to leverage, a top-down approach can be provided as well. In this case, the services in classes of equivalence may be labeled and grouped to indicate which products provide similar functionality. Examples of classes of equivalence rules are: "Web application servers are: WebLogic, JBoss, JRun, Tomcat"; "Database servers are: DB2, Access, dBase, MySQL, Oracle, SyBase". In FIG. 2, nodes clustered together, e.g., 205a-c, belong to the same class of equivalence. Thus, the service developer may be provided hierarchical dropdown lists (e.g., Web application servers-> Details, Database servers-> Details) to choose from, facilitating the service development. Another possible embodiment is providing search functionality that tries matching the description of a new service and of its sub-components to existing services' description.

Further, IT expert knowledge may be reflected as limitations on the graph, for instance known service dependencies, e.g., "Web application server M version a.b.c works with database server N version x.y.z"; "Web application server M version a.b.c works on Linux Suze version n.m". The green Config( ) arrows in the BSS indicate such configuration dependencies. Lack of an arrow indicates either an unfeasible or an unsupported dependency. Configuration conflicts are another potential type of limitations. Examples of software conflict constraints are: "Windows Defender has issues on Windows Vista"; "Websphere AS v5 on an AIX conflicts with Oracle Web Services Manager". Not all valid dependencies and constraints are shown in FIG. 3 for visibility reasons.

In addition to the IT constraints, monetary rules may be present, related, but not limited to cost of sub-services, recommended price, suggested price composition schema, labor, minimum/maximum consumption, etc. These additional requirements may be included during service creation when available, and are required to complete the service description for the service subscription step.

Service Deployment

The deployment of a new service involves its potential assignment to resources into data center(s) from which the service will be provisioned at delivery time upon customer subscription to that service (see block 406, FIG. 4). It is also where the service can become available in the BSS Services Catalog in case of successful resource assignment. Typically, a service provider manages services across multiple data centers. The resource assignment identifies the data center(s) equipped with the appropriate type of resource to provide the service, regardless whether utilized or not. The resource availability may be verified at provisioning time.

Different services may be placed differently on data centers depending on their particular requirements. At least two classes of services may be considered, leading to two complementary placement algorithms:

1. Application critical services (e.g., Desktop Service, Storage Service, Communication Service, etc.): due to strict quality of service requirements (e.g., delay, jitter per customer), this class of services needs to model the service requirements per customer type at deployment time to identify potential customer locations given the data center positions. Service requirements include business-level parameters of the service (e.g., the number of users, quality of service targets such as maximum average response time, etc.).

2. Best effort services (e.g., Bulk processing services as in Billing Services, Componential Intensive Grid like Services): considering a PODs like data center deployment approach, the potential PODs locations can be identified given a customer location distribution.

In both classes, the IT requirements populated during the new service creation are subjected here to the data centers' IT constraints (the matching process is detailed in the Formulation Section). For example, a service requiring a CPU of {8} will be rejected when matched against data centers providing CPU within the {2, 4} values only. The OSS is required to acquire additional hardware to satisfy that new service. When all IT requirements of a new service have been validated as supported by OSS, the service is considered deployable and may be added to the BSS Services Catalog.

Additional details on the customer locations, requirements models and services costs can help identify the costs of potential customers depending of their locations for Application critical services class and the PODs locations for the Best effort services class at service deployment time, before actual subscriptions occur. This complementary information is valuable for marketing to target cost effective customers for a new service. For instance, in the Application critical services class case, a given QoS requirement model (e.g., response time within a range 90% of the time) can be provided at different costs in different geographical regions due to differences in the equipment required (additional proxies, bandwidth etc.).

FIG. 3 illustrates the cost distribution per potential customers' locations (inner circles and outer circles) for each of three data centers 301-303 of a service provider, given a deployable service's costs and a customer requirement model (QoS1).

Each data center 301-303 includes a first area 304, 306, 308 having a first service cost and a second area 305, 307, 309 having a second higher service cost. For customers located in an overlapping area of a high cost ($$$) and a low cost ($) service, e.g., area 310, service is more likely to be provisioned from the data center able to provide low cost service, e.g., 301. The final decision however will be taken at subscription time when the concrete customer requirements will be available.

Service Subscription

Publishing a new service in the BSS Services Catalog makes it available for customers to subscribe to it. The actual resource allocation and provisioning take place at that time. Resource allocation may be performed for improved service performance, network speed, cost savings, etc.

Upon service subscription, the values of the customer requirements and the costs associated with the different aspects of the service are collected. Then, all the service requirements are populated and the matching process may be performed against the data center resource type and availability (see the matching algorithm details in the Formulation Section). By matching the customer requirements against the data centers availabilities, the valid data center(s) are selected. The valid data center (if any) with minimum cost is selected for service provisioning.

An exemplary embodiment of this disclosure considers the optimization algorithm described below for the Application critical services class.

Exemplary notation and formulations of a problem of optimizing the service resource allocation are described herein.

Referring to the exemplary notation; the universe of objects is represented as $V=\{C_i\}$, where the $C_i$ are objects with assigned attributes restricted by rules. They correspond to BSS services and sub-services, and OSS operations with their attribute models as detailed below. A Services Catalog graph G(V,E) expresses the potential relationships between objects in V, linking as well the BSS and OSS sub-graphs. An example of such a graph was given in FIG. 2.

A new customer subscription service description may be constructed as a graph S=(V',E'), where is the set with some objects appearing zero or more times. That is, for any node $v \in V$, V' may have copies of this node represented as $v^1, \ldots, v^k$, for some k. These are referred to herein as separate instances of the same object. Since a particular product may appear several times in the deployed service environment (e.g., there may be multiple virtual machines with Windows or multiple copies of WAS v6 running on different virtual machines), wherein the concept of instances may be used to distinguish them.

The objects are assigned rules on different attributes, which correspond to service requirements as described in the previous Section. They are relevant at a particular service level. For instance, a delay attribute defined at Desktop Service description level will be represented by an attribute $C_i$:delay within the vertex object $C_i$ Desktop Service, while a CPU attribute defined for a WAS v6 image Installation Service will be represented by an attribute $C_j$:CPU within the vertex object $C_j$ WAS v6. In case of attributes requiring aggregation (e.g., summed up, maximized, minimized), a function (e.g., sum, max, min) and the condition under which the aggregation takes place are associated with the attribute: $C_i$:attribute:aggreg( ):condition.

Each attribute may be subject to rules that differ from one object to the other. The rules of an object in the G and S graphs need satisfy the related rules of that object's parent vertex. Each configuration implementing a rule is given a cost (zero or more) that reflects all costs associated with its attribute, for example, product costs, administration costs, downtime costs etc. Thus, the cost of an object is computed by considering all its rules' costs in view of their attribute aggregation function. An exemplary cost function may be written as:

$$c: V \to \mathfrak{R}$$

Note that costs may be weighted to reflect the service or customer's preferences and criteria of optimization; e.g., if a customer requires that particular quality of services are more important then others, the corresponding QoS attributes will be given a higher weight. The cost function c is extended to the domain V', treating each instance identically as the original. Further, consider an edge cost function:

$$e: V \times C(V' \times V') \to \mathfrak{R}$$

which represents the cost of invoking the sub-services of the current service. It has the property that if x are not linked, e(x,y)=0. That is, for unrelated services, there is no edge cost. Note that the rules and edge costs, similarly to the requirements themselves, may be collected during the service creation time as well as during the deployment time for each data center participating in the placement optimization. Some costs may be available only at the data center (OSS) level (e.g., for hardware, software image management, etc.), while others are available only at BSS level (e.g., for software configuration). Additionally, costs may vary from one data center to another. In order to integrate this variability, the graphs as available in the Services Catalog do not contain the cost value itself; instead the rules are tagged (1 or 0) whether their cost is to be considered to the object's total cost or not. Thus, at subscript I on time, multiple S service graphs are generated, one for each valid data center. Problem Statement Thus, resources may be allocated to a given new service in one of multiple data centers. The constraint is placed upon the allocation is that the allocation cost should be minimized while the data center and services requirements are matched. More formally, to find the graph S that has the minimum total cost consider the exemplary formula:

$$\sum_{v \in V'} c(v) + \sum_{u,v \in V'} e(u, v).$$

Matching Process

Two resource constraint models are maintained for each data center, a resource type based model and an availability based model. The first model inventories the IT resources belonging to a data center. Each resource is described in terms of its attributes and their concrete values (e.g., CPU can be {2, 4, 8}). This model is used both during service deployment as well as service subscription to identify whether all required IT resources are present in data centers, regardless whether utilized or not. The second model describes the resources availability (CPU currently available {8}) and it is used during service subscription to identify whether the service can actually be provisioned in data centers or not. Other type of constraints such as services dependencies and conflict may be reflected in the S graph construction itself in the form of link presence or absence between vertices.

Each matching process, at service deployment and at service subscription, involves four steps, three automatic and one manual. Each BSS attribute that has associated concrete values in the S graph is automatically aggregated down to the OSS level following the respective aggregation function when meeting the specified conditions. By automatically comparing each S graph attributes to the corresponding data center constraint model, the attributes not present in the model can be identified. This may be relevant for attributes related to QoS requirements, such as delay. Data center experts manually populate the data center constraint model with the missing attributes and their exact or estimated values. For example, if delay is the attribute to be provided for a data center with respect to a given customer whose location is known, the response time of a typical transaction of the service may be estimated considering different types of infrastructure (at different costs). Once all attributes are provided for all data centers' constraint models, the S graph aggregated requirements may be automatically matched to the constraint model. Thus, the resource type constraints and at service subscription both the resource type and availability may be validated at service deployment.

Minimum Cost Computation

A cost model is maintained for each data center that associates cost to all configuration items available in the data center. The cost computation includes three steps, one manual and two automatic. After all requirements have been populated in the S graph and assuming the service passed the matching process validations, the cost associated with each configuration implementing a rule in the graph S is automatically populated from the corresponding data center cost model. The attributes remaining without a cost associated in the graph S may be manually populated. Example of an attribute whose cost may not be available is the delay, for which the cost as a function of delay can be estimated, considering different technologies to ensure specific delay requirements. If a cost cannot be provided at the level (vertex) it has been defined, the related attribute is propagated to all the children vertices, with its rules, recursively, until the sub-services entitled to provide the cost are reached. Third, each S graph is automatically traversed to collect all the costs and compute the total service cost.

Note that those skilled in the art may adjust this algorithm for different goals, for instance to allocate resources to a given new service in one or more of a service provider's data centers.

Post-Service Subscription

In case a customer needs to expend their service with additional resources, for example due to increased load, the customer service graphs S are again generated and the optimization algorithm re-run to find a new placement. Optionally, the costs in the data center that deploys currently the service for that customer can be weighted down to reflect the desire to expand the currently allocated resources and avoid migration to a new data center.

Similarly, in case of a service that includes dynamic resource allocation, such as the Web Hosting service, the S graph generation and optimization algorithm re-run take place each time the load breaches the load ranges as defined in the service load to resource mapping requirements.

Referring again to FIG. 4, according to an exemplary embodiment of the present disclosure a method for service creation based on graph mapping includes constructing a graph with nodes representing business and operational features 401, identifying nodes in graph related to the new service 402, extending the graph by adding new nodes representing unique features and requirements of the new service 403, specifying requirements on the new nodes 404, aggregating over nodes related to the new service to determine operational requirements 405, and assigning the new service to a data center that can support those operational requirement 406. Operational requirements include just those concepts that are known by the data center (e.g., the number of virtual machines, the number of CPU cores for each virtual machines, the amount of memory, latency and bandwidth to/within the data center, etc.).

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 5:
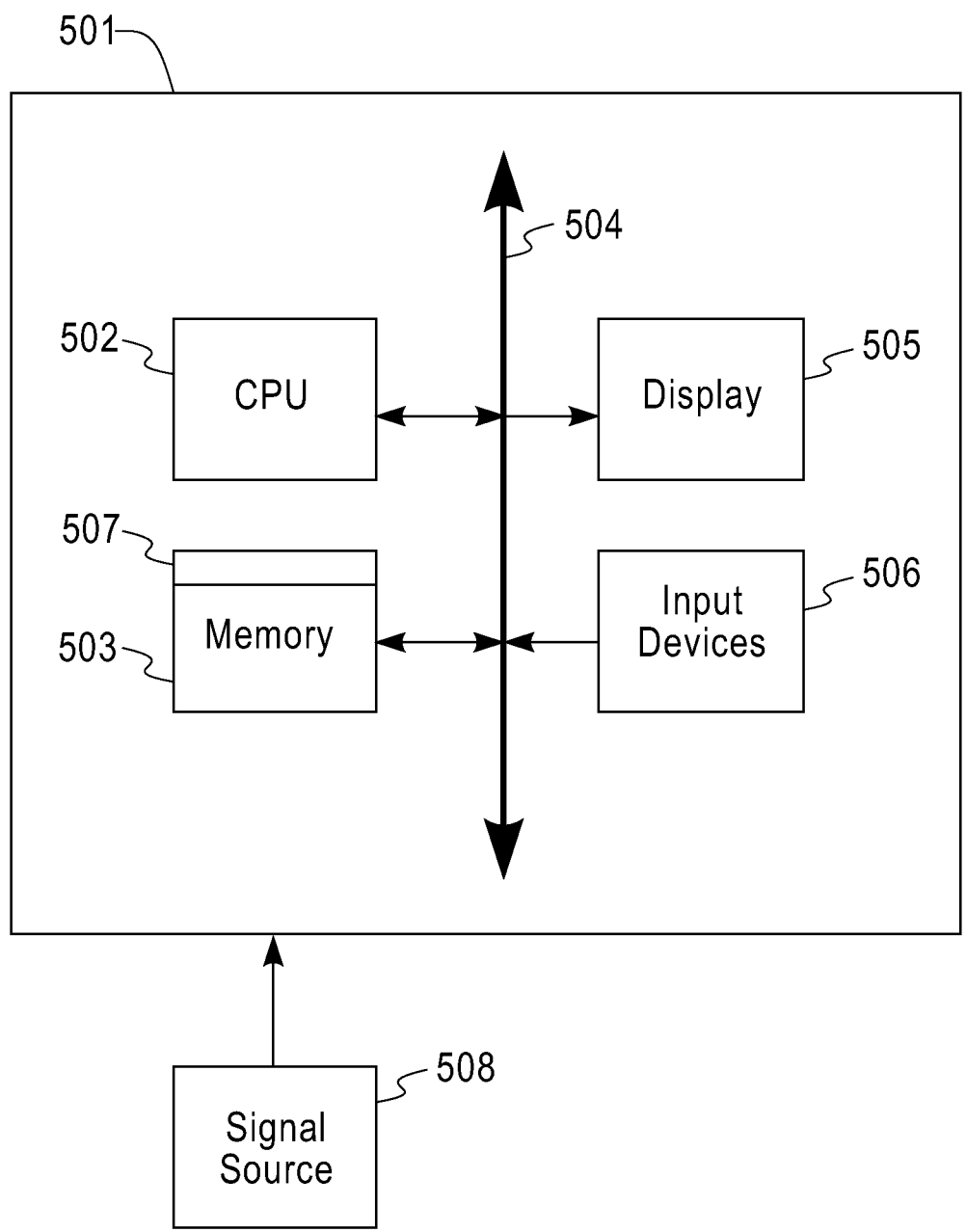
FIG. 5 is a computer system for implementing a method according to an embodiment of the present disclosure.

More particularly, referring to FIG. 5, according to an embodiment of the present disclosure, a computer system 501 for implementing a method for service creation based on graph mapping can comprise, inter alia, a central processing unit (CPU) 502, a memory 503 and an input/output (I/O) interface 504. The computer system 501 is generally coupled through the I/O interface 504 to a display 505 and various input devices 506 such as a mouse and keyboard. The support circuits can include circuits such as cache, power supplies, clock circuits, and a communications bus. The memory 503 can include random access memory (RAM), read only memory (ROM), disk drive, tape drive, etc., or a combination thereof. The present invention can be implemented as a routine 507 stored in memory 503 (e.g., a non-transitory computer-readable storage medium) and executed by the CPU 502 to process the signal from the signal source 508. As such, the computer system 501 is a general-purpose computer system that becomes a specific purpose computer system when executing the routine 507 of the present invention.

The computer platform 501 also includes an operating system and micro-instruction code. The various processes and functions described herein may either be part of the micro-instruction code or part of the application program (or a combination thereof) which is executed via the operating system. In addition, various other peripheral devices may be connected to the computer platform such as an additional data storage device and a printing device.

Having described embodiments for service creation based on graph mapping, it is noted that modifications and variations can be made by persons skilled in the art in light of the above teachings. It is therefore to be understood that changes may be made in exemplary embodiments of disclosure, which are within the scope and spirit of the invention as defined by the appended claims. Having thus described the invention with the details and particularity required by the patent laws, what is claimed and desired protected by Letters Patent is set forth in the appended claims.

What is claimed is:

1. A non-transitory computer readable medium embodying instructions executed by a processor to perform a method for service creation based on graph mapping, the method steps comprising:
constructing a graph that includes a plurality of nodes representing support services, the plurality of nodes include a first plurality of nodes representing business support services supporting operations involved in running a business and a second plurality of nodes representing operation support services that process requests from the business support services, the operation support services also contain information on configuration and state of a plurality of data centers, and at least one of the first plurality of nodes is connected to at least one of the second plurality of nodes;
receiving a new business service creation request that includes new business service requirements;
scanning the graph, based on the new service requirements, to identify a node that represents a first support service required by the new business service;
determining that the graph lacks a node that represents a second support service that is also required by the new business service based on the new service requirements;
modifying the graph to generate a modified graph by adding a new node that represents the second support service and connecting the new node to the identified node, the identified node and new node together represent the requirements of the new business service;
deploying the new business service on one of the plurality of data centers, where the deploying comprises:
aggregating over all nodes of the modified graph related to the new business service to determine an attribute needed to perform the new business service, and
deploying the new business service only on the one of the plurality of data centers that has the attribute based on the information on configuration and state.

2. The computer readable medium of claim 1, wherein the deployment of the new business service on the one of the plurality of data centers is based on service requirements and data center resource types at service deployment time.

3. The computer readable medium of claim 1, further comprising provisioning the new business service based on service requirements and availability of the one of the plurality of data centers at service delivery time.

4. The computer readable medium of claim 1, further comprising performing a modular re-composition of the first support service and the second support service as components defining the new business service.

5. The computer readable medium of claim 4, further comprising providing dynamic access to the components of the new business service.

6. The computer readable medium of claim 1, wherein one of the requests creates a virtual machine.

7. The computer readable medium of claim 1, wherein the first support service is a web hosting infrastructure service, the new business service is a Web Hosting service, and the second support service provides support to configure a user environment.

8. The computer readable medium of claim 1, wherein the first support service is a web hosting infrastructure service, the new business service is a Web Hosting service, and the second support service provides a dynamic infrastructure that depends on workload.

9. The computer readable medium of claim 1, wherein the first support service is a web hosting infrastructure service, the new business service is a Web Hosting service, and the second support service enables development of middleware configuration scripts.

10. The computer readable medium of claim 1, wherein the first support service is a web hosting infrastructure service, the new business service is a Web Hosting service, and the second support service enables information technology monitoring support.

11. The computer readable medium of claim 1, wherein the attribute indicates a number of virtual machines of the one of the plurality of data centers.

12. The computer readable medium of claim 11, wherein the attribute further indicates a number of central processing unit (CPU) cores for each virtual machine.

13. The computer readable medium of claim 1, wherein the attribute indicates an amount of memory on the one of the plurality of data centers.

14. The computer readable medium of claim 1, wherein the attribute indicates a bandwidth of the one of the plurality of data centers.

15. A non-transitory computer readable medium embodying instructions executed by a processor to perform a method for service creation based on graph mapping, the method steps comprising:
constructing a graph that includes first plurality of nodes each representing a business support service supporting business operations in running a business and a second plurality of nodes each representing operation support service with operational features of each corresponding business support service;
receiving a new service creation request that includes new service requirements;
identifying nodes from among the first plurality of nodes and the second plurality of nodes in the graph that perform business support services required by the new service based on the new service requirements;
determining the graph lacks other nodes that perform other business support services that are also required by the new service based on the new service requirements;
modifying the graph by adding new nodes to represent the required other business support services, and linking the new nodes to the identified nodes to form nodes representing to the new service;
aggregating over the nodes representing the new service to determine an operational requirement of the new service; and
assigning the new service only to a data center that supports the determined operational requirement based on information containing configuration and state of the data center, wherein the determined operational requirement is an attribute that corresponding to an attribute of the data center.

16. The computer readable medium of claim 15, further comprising assigning the new service to the data center based on the operational requirement and a data center resource type at a service deployment time.

17. The computer readable medium of claim 15, further comprising provisioning the new service based on the operational requirement and availability of the data center at service delivery time.

* * * * *